United States Patent
Medasani et al.

(10) Patent No.: US 8,589,315 B2
(45) Date of Patent: Nov. 19, 2013

(54) BEHAVIOR RECOGNITION USING COGNITIVE SWARMS AND FUZZY GRAPHS

(75) Inventors: Swarup Medasani, Thousand Oaks, CA (US); Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 836 days.

(21) Appl. No.: 11/800,264

(22) Filed: May 3, 2007

(65) Prior Publication Data

US 2007/0263900 A1    Nov. 15, 2007

Related U.S. Application Data

(63) Continuation-in-part of application No. 10/918,336, filed on Aug. 14, 2004, now Pat. No. 7,636,700.

(51) Int. Cl.
*G06F 15/18* (2006.01)
*G06F 15/00* (2006.01)

(52) U.S. Cl.
USPC .............................................. 706/1; 706/62

(58) Field of Classification Search
USPC ....................................................... 706/62, 1
See application file for complete search history.

(56) References Cited

U.S. PATENT DOCUMENTS

| | | | |
|---|---|---|---|
| 7,558,762 | B2 | 7/2009 | Owechko et al. |
| 7,672,911 | B2 | 3/2010 | Owechko et al. |
| 2003/0002445 | A1* | 1/2003 | Fullana et al. ................. 370/241 |
| 2004/0113933 | A1* | 6/2004 | Guler ............................ 345/716 |
| 2006/0222079 | A1* | 10/2006 | Park et al. ................. 375/240.16 |

OTHER PUBLICATIONS

Jung, Sung-Hwan. "Content-Based Image Retrieval Using Fuzzy Multiple Attribute Relational Graph" IEEE 2001, p. 1508-1513.*
Wang, Qicong, Li Xie, Jilin Liu, and Zhiyu Xiang. "Enhancing Particle Swarm Optimization Based Particle Filter Tracker" Springer-Verlag Berlin Heidelberg Sep. 1, 2006 p. 1216-1221.*
Zhu, Xingquan, Xindong Wu, Ahemed Elmagarmid, Zhe Feng, and Lide Wu. "Video Data Mining: Semantic Indexing and Event Detection from the Association Perspective" IEEE May 2005 p. 1-18.*
Owechko, Yuri Swarup Medasani, and Narayan Srinivasa "Classifier Swarms for Human Detection in Infrared Imagery" [Online] Proceedings of the 2004 IEEE Computer Society Conference on Computer Vision and Pattern Recognition Workshops. IEEE. Downloaded May 20, 2010 http://ieeexplore.ieee.org/stamp/stamp.jsp?tp=&arnumber=1384917.*
S. Medasani and R. Krishnapuram, "Graph Matching by Relaxation of fuzzy assignments," IEEE Transactions on Fuzzy Systems, 9(1), 173-183, Feb. 2001.

(Continued)

*Primary Examiner* — Ben Rifkin
(74) *Attorney, Agent, or Firm* — Tope-McKay & Associates

(57) ABSTRACT

Described is a behavior recognition system for detecting the behavior of objects in a scene. The system comprises a semantic object stream module for receiving a video stream having at least two frames and detecting objects in the video stream. Also included is a group organization module for utilizing the detected objects from the video stream to detect a behavior of the detected objects. The group organization module further comprises an object group stream module for spatially organizing the detected objects to have relative spatial relationships. The group organization module also comprises a group action stream module for modeling a temporal structure of the detected objects. The temporal structure is an action of the detected objects between the two frames, whereby through detecting, organizing and modeling actions of objects, a user can detect the behavior of the objects.

9 Claims, 10 Drawing Sheets

(56) References Cited

OTHER PUBLICATIONS

R. Krishnapuram, S. Medasani, S. Jung and Y. Choi, "Content-Based Image Retrieval Based on a Fuzzy Approach," IEEE Transactions on Knowledge and Data Engineering (TKDE), Oct. 2004.

N. Oliver and A. Pentland, "Graphical models for driver behavior recognition in a smart car," Proc. Of IV2000.

K. Sato and J.K. Aggarwal, "Temporal spatio-velocity transform and its application to tracking and interaction," CVIU 96(2004), 100-128.

S. Hongeng, R. Nevatia, and F. Bremond, "Vide-based event recognition: activity representation and probabilistic recognition methods," CVIU 96(2004), 129-162.

G. Medioni, I. Cohen, F. Bremond, S. Hongeng, R. Nevatia, "Event detection and analysis from video streams," IEEE PAMI 23(8), 2001, 873-889.

N. Oliver, A. Garg, and E. Horvitz, "Layered representations for learning and inferring office activity from multiple sensory channels," CVIU 96(2004), 163-180.

A. Amir, S. Basu, G. Iyengar, C. Lin, M. Naphade, J.R. Smith, S. Srinivasa, and B. Tseng, "A multi-modal system for retrieval of semantic video events," CVIU 96(2004), 216-236.

R.T. Collins, A. J. Lipton, and T. Kanade, "Introduction to the special section on video surveillance," IEEE-PAMI, 22(8), Aug. 2000.

N. Oliver, B. Rosario, and A. Pentland, "A Bayesian computer vision system for moceling human interactions," IEEE-PAMI, 22(8), Aug. 2000.

Y. Owechko, S. Medasani, and N. Srinivasa, "Classifier Swarms for Human Detection in infrared imagery," Proc. Of the CVPR workshop on Object Tracking and Classification Beyond the Visible Spectrum (OTCBVS'04) 2004.

M.P. Windham, "Numerical classification of proximity data with assignment measure," Journal of Classification, vol. 2, pp. 157-172, 1985.

S. Gold and A. Rangarajan, "A graduated assignment algorithm for graph matching," IEEE Transaction on Pattern Analysis and Machine Intelligence, vol. 18, pp. 377-387, Apr. 1996.

J.C. Bezdek, Pattern Recognition with Fuzzy Objective Function Algorithms, Plenum Press, New York, 1981.

Z. Zhang, "A flexible new technique for camera calibration," IEEE Transactions on Pattern Analysis and Machine Intelligence, 22(11): 1330-1334, 2000.

Jean-Yves Bouguet, "Camera Calibration Toolbox for Matlab," http://www.vision.caltech.edu/bouguetj/calib_doc/.

Intel OpenCV Computer Vision Library (C++), http://www.intel.com/research/mrl/research/opencv/.

Giorgio Carpaneto, Paolo Toth, "Algorithm 548: Solution of the assignment problem [H]," ACM Transactions on Mathematical Software, 6(1): 104-111, 1980.

I. Hartley, A. Zisserman, "Multiple view geometry in computer vision," Cambridge University Press, Cambridge, UK 2000.

Longuet-Higgins, "A computer algorithm for reconstructing a scene from two projections" Nature, 293: 133-135, Sep. 1981.

T. Kailath, et al., "Linear Estimation," Prentice Hall, NJ, ISBN 0-13-022464-2, 854pp. 2000.

P. Saisan, "Modeling Human Motion for recognition," IS&T/SPIE 17th annual symposium, San Jose, CA 2005.

Y. Owechko, et al., "Vision-Based occupant sensing and recognition for intelligent airbag systems," submitted to IEEE Trans. On Intelligent Transportation Systems, 2003.

A.R. Dick, et al., "Combining Single view recognition and multiple view stereo for architectural scenes," International Conference on Computer Vision (ICCV'01) vol. 1, Jul. 7-14, 2001, Vancouver, B.C., Canada.

G. Shakhanarovich, et al. "Integrated face and gait recognition from multiple views," In Proceedings of the IEEE Conference on Computer Vision and Pattern Recognition, Dec. 2001, Kauai, Hawaii.

Sujit Kuthirummal, et al., "Planar shape recognition across multiple views," In Proceedings of the Interationa Conference on Pattern Recognition (ICPR)—2002, Quebec, Canada.

Sujit Kuthirummal, et al., "Multiview constraints for recognition of planar curves in fourier domain," Proceedings of the Indian Conference on Vision Graphics and Image Processing (ICVGIP)—2002.

A. Selinger and R.C. Nelson, "Appearance-based object recognition using multiple views," In Proceedings of the IEEE Conference on Computer Vision and Pattern Recognition—Dec. 2001, Kauai, Hawaii.

D.L. Swets, et al., "Genetics Algorithms for Object Recognition in a complex scene," Proc. Of Intl. Conference on Image Processing, vol. 2, Oct., pp. 23-26, 1995.

V. Ciesielski and M. Zhang, "Using Genetic Algorithms to Improve the Accuracy of Object Detection," In Proceedings of the third Pacific-Asia Knowledge Discovery and Data Mining Conference, Ning Zhong and Lizhu Zhou (Eds.), Knowledge Discovery and Data Mining—Research and Practical Experiences. Tsinghua University Press, p. 19-24. Beijing, China, Apr. 26-31, 1999.

Kennedy, J., et al., "Swarm intelligence," San Francisco: Morgan Kaufmann Publishers, 2001.

R.C. Eberhart, et al., "Particle swarm optimization: Developments, applications, and resources," 2001.

R. Brits, et al., "A Niching Particle Swarm Optimizer," 2002.

F. Rojas, I. Rojas, R. M. Clemente, and C.G. Puntoner, "Nonlinear blind source separation using genetic algorithms," in Proceedings of International Conference on Independent Component Analysis, 2001.

D. Beasley, D. R. Bull, and R. R. Martin, "A Sequential Niching Technique for Multimodal Function Optimization," Evolutionary Computation, 1(2), p. 101-125, 1993.

R. Krishnapuram and J. M. Keller, "Quantative Analysis of Properties and Spatial Relations of Fuzzy Image Regions," Transactions on Fuzzy Systems, 1(2):98-110, 1993.

Office action from U.S. Appl. No. 10/918,336.

B. Bhanu, et al., "Adaptive Image Segmentation Using a Genetic Algorithm," IEEE Transactions on Systems, Man, and Cybernetics, vol. 25, No. 12, Dec. 1995.

Y. Owechko and S. Medasani, "A Swarm-based Volition/Attention Framework for Object Recognition," IEEE Conference on Computer Vision and Pattern Recognition, San Diego, Proc. Of CVPR-WAPCV 2005.

Y. Owechko and S. Medasani, "Cognitive Swarms for Rapid Detection of Objects and Associations in Visual Imagery," IEEE Swarm Intelligence Symposium, Pasadena, 2005.

P. Saisan, S. Medasani, and Y. Owechko "Multi-View Classifier Swarms for Pedestrian Detection and Tracking," IEEE Conference on Computer Vision and Pattern Recognition, San Diego, 2005.

N. Srinivasa, et al., "Fuzzy edge-symmetry features for enhanced intruder detection," 11th International Conference on Fuzzy Systems, FUZZIEEE 2003.

F. Orabona, G. Metta, and G. Sandini, "Object-based Visual Attention: A Model for a Behaving Robot," in 3rd International Workshop on Attention and Performance in Computational Vision (in CVPR 2005), San Diego, CA, Jun. 2005.

B. J. Scholl, "Objects and Attention: The State of the Art," Cognition 80: 1-46, 2001.

Y. Sun and R. Fisher, "Hierarchical Selectivity for Object-based Visual Attention," submitted to Artificial Intelligence, 2004.

Liao, Wenhul and Ji, Qiang 2006, "Efficient Active Fusion for Decision-making via VOI Approximation," in Proc. AAAI 2006, 1180-1185.

Jaynes, C., Stolle, F., and Collins, R., "Task Driven Perceptual Organization for Extraction of Roofop Polygons," Proceedings of the ARPA Image Understanding Workshop, Monterey, California (Morgan Kaufmann Publishers, San Francisco, 1994), pp. 359-365.

A. Huertas, and R. Nevatia, "Detecting Changes in Aerial Views of Man-Made Structures," IVC200.

R. Mendes, "The Fully Informed Particle Swarm: Simpler, Maybe Better," Special issue of IEEE Trans. On Evol. Computation on Particle Swarm Optimization, vol. 8, No. 3, Jun. 2004.

K.E. Parsopoulos, et al. "On the Computation of All Global Minimizers Through Particle Swarm Optimization," Special issue of IEEE Trans. On Evol. Computation on Particle Swarm Optimization, vol. 8, No. 3, Jun. 2004.

(56) References Cited

OTHER PUBLICATIONS

F. van der Bergh, et al., "A Cooperative Approach to Particle Swarm Optimization," Special issue of IEEE Trans. On Evol. Computation on Particle Swarm Optimization, vol. 8, No. 3, Jun. 2004.
A. Ratnaweera, "Self-Organizing hierarchical particle Swarm Optimizer with Time-Varying Acceleration Coefficients," Special issue of IEEE Trans. On Evol. Computation on Particle Swarm Optimization, vol. 8, No. 3, Jun. 2004.
C.A. Coello, "Handling Multiple Objectives With Particle Swarm Optimization," Special issue of IEEE Trans. On Evol. Computation on Particle Swarm Optimization, vol. 8, No. 3, Jun. 2004.
L. Messerschmidt, et al., "Learning to Play Games Using a PSO-Based Competitive Learning Approach," Special issue of IEEE Trans. On Evol. Computation on Particle Swarm Optimization, vol. 8, No. 3, Jun. 2004.
M.P. Wachwiak, et al., "An Approach to Multimodal Biomedical Image Registration Utilizing Particle Swarm Optimization," Special issue of IEEE Trans. On Evol. Computation on Particle Swarm Optimization, vol. 8, No. 3, Jun. 2004.
R. Hassan, B. Cohanim, and O. de Weck, "A Comparison of Particle Swarm Optimization and the Genetic Algorithm," AIAA Conference, 2005.
J.F. Schutte, J.A. Reinbolt, B.j. Fregly, R.T. Haftka, and A.D. George, "Parallel Global Optimization with the Particle Swarm Algorithm," Int. J. Numerical methods in Engineering, 61: 2296-2315, 2004.
J. Kennedy and W.M. Spears, "Matching Algorithms to Problems: An Experimental Test of the Particle Swarm and Some Genetic Algorithms on the Multimodal Problem Generator," Proceedings of IEEE Inter. Conf. on Evolutionary Computation, 78-83, 1998.
Bradski, G. and S. Grossberg (1995), "Fast learning VIEWNET architectures for recognizing 3-D objects from multiple 2-D views," Neural Networks 8, 1053-1080.
Charniak, E. (1991), "Bayesian networks without tears," AI Magazine 12, 50-63.
Hu, W., D. Xie, et al. (2004), "Learning activity patterns using fuzzy self-organizing neural network," IEEE Transactions on Systems, Man, and Cybernetics—Part B: Cybernetics 34, 1618-1626.
Lazebnik, S., C. Schmid, et al. (2006), "Beyond bags of features: Spatial pyramid matching for recognizing natural scene categories," IEEE Conference on Computer Vision and Pattern Recognition, New York, NY.
Lowe, D. (1999), "Object recognition from local scale-invariant features," International Conference on Computer Vision, Corfu, Greece.
Medasani, S. and Y. Owechko (2007), "Behavior recognition using cognitive swarms and fuzzy graphs," SPIE Defense and Security Symposium, Orlando, FL.
S. Medasani, and Y. Owechko, "Possibilistic Particle Swarms for Optimization," Proceedings 5673 of SPIE/IST Symposium on Electronic Imaging, San Jose, 2005.
Park, S. And J. Aggarwal (2003), "A hierarchical Bayesian network for event recognition of human actions and interactions," ACM SIGMM International Workshop on Video Surveillance, Berkely, CA.
Barbara Zitova and Jan Flusser, "Image registration methods: a survey," Image and Vision Computing 21, pp. 977-1000, 2003.
D. Nister and H. Stewenius, "Scalable recognition with a vocabulary tree," in Proc. CVPR, vol. 5, 2006.
Notice of Allowability for U.S. Appl. No. 11/433,159.
Reply to Notice of Allowance for U.S. Appl. No. 11/433,159.
Notice of Allowability for U.S. Appl. No. 10/918,336.
Notice of Allowability for U.S. Appl. No. 11/800,265.
Notice of Allowability for U.S. Appl. No. 11/367,755.
Notice of Allowability for U.S. Appl. No. 11/385,983.
Khosla, D., Moore, C., and Chelian, S. (2007). A Bioinspired system for spatio-temporal recognition in static and video imagery. Proceedings of SPIE, 6560: 656002.
Judea Pearl, et al., "Bayesian Networks," Handbook of Brain Theory and Neural Networks, Technical Report, R-277, Nov. 2000.
Avrim Blum (1996), "On-Line Algorithms in Machine Learning", in Proceedings of the Workshop on On-Line Algorithms.

\* cited by examiner

BEHAVIOR RECOGNITION USING COGNITIVE SWARMS AND FUZZY GRAPHS

PRIORITY CLAIM

This patent application is a Continuation-in-Part application, claiming the benefit of priority of U.S. Non-Provisional patent application Ser. No. 10/918,336, filed on Aug. 14, 2004, now U.S. Pat. No. 7,636,700 entitled, "Object Recognition System Incorporating Swarming Domain Classifiers."

BACKGROUND OF INVENTION (1) Field of Invention

The present invention relates to a behavior recognition system and, more particularly, to a behavior recognition system that utilizes cognitive swarms and fuzzy graphs to identify spatial and temporal relationships between objects detected in video image sequences that are signatures of specific events.

(2) Related Art

Most existing event detection algorithms are very simplistic and domain-specific. Such algorithms were described by N. Oliver and A. Pentland in a publication entitled, "Graphical Models for Driver Behavior Recognition in a Smart Car," Proc. of IV2000 (hereinafter referred to as "Oliver et al."), and by S. Hongeng, R. Nevatia, and F. Bremond in a publication entitled, "Video-based event recognition: activity representation and probabilistic recognition methods," CVIU 96(2004), 129-162 (hereinafter referred to as "Hongeng et al.").

Current systems first detect moving objects using background subtraction methods that typically suffer from shadows, occlusions, poor video quality and the need to specify view-dependent foreground object rules. Scenarios that are often detected are people walking, running, etc. and usually involve only a single object. Also, past work on event detection has mostly consisted of extraction of object trajectories followed by a supervised learning using parameterized models for actions. For example, Hongeng et al. describes a generic scheme for event modeling that also simplifies the parameter learning task. Actors are detected using probabilistic analysis of the shape, motion, and trajectory features of moving objects. Single agent-events are then modeled using Bayesian networks and probabilistic finite-state machines. Multi-agent events, corresponding to coordinated activities, are modeled by propagating constraints and likelihoods of single-agent events in a temporal logic network.

In Oliver et al., the authors presented a layered probabilistic representation for modeling human activity. The representation is then used to learn and infer user actions at multiple levels of temporal granularity.

Another publication, by A. Amir, S. Basu, G. Iyengar, C. Lin, M. Naphade, J R Smith, S. Srinivasan, and B. Tseng, entitled, "A multi-modal system for retrieval of semantic video events," CVIU 96(2004), 216-236, describes a system for automatic and interactive content-based and model-based detection and retrieval of events and other concepts. Models of semantic concepts are built by training classifiers using training video sequences. These models are then used to classify video segments into concepts such as "water skiing," "person speaking," etc.

The work by K. Sato and J. K. Aggarwal, in "Temporal Spatio-velocity transform and its application to tracking and interaction," CVIU 96(2004), 100-128, describes a novel transformation that elicits pixel velocities from binary image sequences. Basic object interactions, such as "MEET," "FOLLOW," "LEAVE," etc., are then detected using motion-state transitions and shapes of object trajectories.

An approach to detecting when the interactions between people occur as well as classifying the type of interactions, such as "following another person," etc., is presented by N. Oliver, A. Garg, and E. Horvitz, in "Layered representations for learning and inferring office activity from multiple sensory channels," CVIU 96(2004), 163-180.

In a publication by G. Medioni, I. Cohen, F. Bremond, S. Hongeng, R. Nevatia, entitled, "Event detection and analysis from video streams," IEEE PAMI 23(8), 2001, 873-889, the authors introduce an approach that takes video input from an airborne platform and produces an analysis of the behavior of moving objects in the scene. In their approach, graphs are used to model scene objects across the frames (i.e., nodes in the graph correspond to objects in contiguous frames).

While the prior art describes event detection, it does not separate the object detection task from the structural and temporal constraint detection tasks. Nor does the prior art employ swarm-based object recognition. Thus, a need exists for a behavior recognition system that uses swarm-based optimization methods to locate objects in a scene and then uses graph-matching methods to enforce structural and temporal constraints. Such a system has advantages in terms of generality, accuracy, and speed.

SUMMARY OF INVENTION

The present invention relates to a behavior recognition system for detecting the behavior of objects in a scene. The system comprises a semantic object stream module for receiving a video stream having at least two frames and detecting objects in the video stream. The system also includes a group organization module for utilizing the detected objects from the video stream to detect a behavior of the detected objects.

The group organization module further comprises an object group stream module, the object group stream module being configured to spatially organize the detected objects to have relative spatial relationships.

In another aspect, the group organization module further comprises a group action stream module configured to model a temporal structure of the detected objects. The temporal structure is an action of the detected objects between the two frames, whereby through detecting, organizing and modeling actions of objects, a user can detect the behavior of the objects.

Furthermore, the group organization module is operative for using fuzzy attributed relational graphs (FARGs) for modeling spatial and temporal aspects of the behavior of the object to generate a scene FARG from the detected objects in the scene. The FARGs include nodes and edges. The nodes represent different objects in the scene and the edges represent relationships between the objects.

In yet another aspect, the system is further configured to receive a user query to detect a desired behavior, and based on the query and objects in the video stream, identify if the objects exhibit the desired behavior. The user query is in a form selected from a group consisting of a linguistic query, a graphical query, and a markup language query.

In another aspect, the system is further configured to associate the user query with a behavior FARG. The behavior FARG models the spatial and temporal aspects of a behavior the user is searching for, and once associated, the system matches the scene FARG with a behavior FARG to identify an object exhibiting the desired behavior.

Additionally, the system is configured to match the scene FARG with the behavior FARG using a fuzzy graph matching (FGM) algorithm.

In yet another aspect, the semantic object stream module further comprises a plurality of agents that are configured to detect objects in the video stream.

Finally, as can be appreciated by one in the art, the present invention also includes a method and computer program product. The computer program product comprises computer-readable instruction means stored on a computer-readable medium that are executable by a computer for causing the computer to perform the operations described herein. Additionally, the method comprises a plurality of acts. The acts include the operations of the behavior recognition system according to the present invention.

BRIEF DESCRIPTION OF THE DRAWINGS

The objects, features, and advantages of the present invention will be apparent from the following detailed descriptions of the various aspects of the invention in conjunction with reference to the following drawings, where.

DETAILED DESCRIPTION

Figure 1:
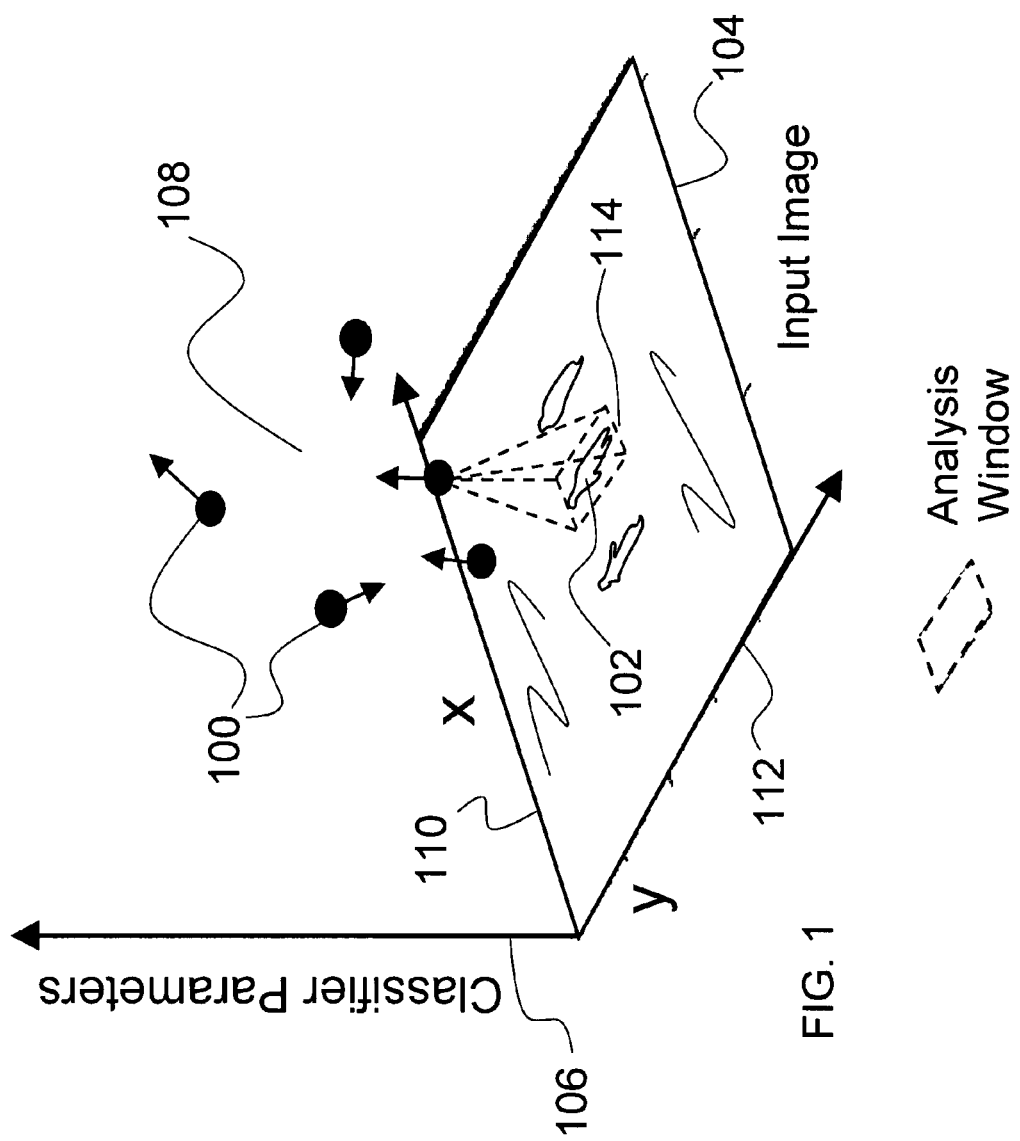
FIG. 1 is an illustration of an exemplary object recognition using a cognitive swarm of classifier agents.

The present invention relates to a behavior recognition system, and more particularly, to a behavior recognition system that utilizes cognitive swarms and fuzzy graphs to identify spatial and temporal relationships between objects. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. Additionally, the process for object recognition using swarming image classifiers draws material from the process shown and described in U.S. patent application Ser. No. 10/918,336, the entire disclosure of which is incorporated herein by reference as though fully set forth herein. All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a glossary of terms used in the description and claims is presented. Next, a description of various principal aspects of the present invention is provided. Third, an introduction is provided to give the reader a general understanding of the present invention. Finally, details of the invention are provided to give an understanding of the specific details.

(1) Glossary

Before describing the specific details of the present invention, a glossary is provided in which various terms used herein and in the claims are defined. The glossary provided is intended to provide the reader with a general understanding for the intended meaning of the terms, but is not intended to convey the entire scope of each term. Rather, the glossary is intended to supplement the rest of the specification in more accurately explaining the terms used.

Domain—The term "domain" refers to any searchable space having dimensions such as spatial coordinates, scale, frequency, time, Doppler shift, time delay, wave length, and phase. Domain is often attributed to an image having an object group in the image with spatial coordinates and scale. As a non-limiting example, a domain is a video stream that has at least two frames and includes images of objects in the video stream.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e., computer operations coded into a computer chip). The "instruction means" may be stored in the memory of a computer or on a computer-readable medium such as a floppy disk, a CD-ROM, and a flash drive.

Large Core—The term "large core" refers to a relatively large volume in the solution space in which all points have classification confidence values above a given threshold. Objects of interest tend to generate large cores.

Particle—The term "particle" refers to agents that are self-contained object classifiers that cooperate with other agents in finding objects in the scene. The terms "agents" and "particles" are used interchangeably herein. It should not be confused with particle filters which are completely different and are used for estimating probability distributions for tracking applications.

PSO—The term "PSO" refers to a particle swarm optimization (PSO) algorithm that searches a multi-dimensional solution space using a population of software agents (i.e., particles) in which each agent has its own velocity vector. The success of each agent in finding good solutions has an influence on the dynamics of other members of the swarm.

Sequential Niching—The term "sequential niching" refers to a method for searching a domain, where once the software agents identify and classify an object in the domain, the object is erased from the domain so that the swarm can continue searching the domain for additional objects without being distracted by the previously identified object.

Small Core—The term "small core" refers to a relatively small volume in the solution space in which all points have classification confidence values above a given threshold. Non-object false alarms tend to generate small cores.

Software Agent—The term "software agent" refers to a self-contained computer program that operates autonomously, although its behavior may be affected by the actions of other agents. The term "software agent" or simply "agent" is also to be used interchangeably with the word "particle."

Window—The term "window" refers to an analysis window determined by each agent's location in the image spatial coordinates and scale coordinates. The analysis window is the image region processed by the agent to determine if an object is located there.

(2) Principal Aspects

The present invention has three "principal" aspects. The first is a behavior recognition system, typically in the form of software and/or manual operations, operated using a data processing system (e.g., computer). When in the form of software, it is typically in the form of software modules configured to perform the operations described herein. The second principal aspect is a method for behavior recognition, the method operating using a computer system. The third principal aspect is a computer program product. The computer program product generally represents computer-readable instructions (e.g., source or object code) stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read only memory (ROM), and flash-type memories. These aspects will be described in more detail below.

(3) Introduction

The present invention is a behavior recognition system. A related application, U.S. patent application Ser. No. 10/918,336, entitled, "Object Recognition System Incorporating Swarming Domain Classifiers," describes a method using "cognitive swarms" for visual recognition of objects in an image. Application Ser. No. 10/918,336 is incorporated by reference as though fully set forth herein. The cognitive swarms combine feature-based object classification with efficient search mechanisms based on swarm intelligence. Cognitive swarms comprise groups of object classifier agents that both cooperate and compete to find objects, such as humans or vehicles, in video data using particle swarm optimization (PSO). As described in the previous application, a single large swarm detects and recognizes objects in images very efficiently.

The present invention expands on the cognitive swarm idea by adding a framework for behavior recognition using cognitive swarms and fuzzy graphs. Behavior analysis deals with understanding and parsing a video sequence of object observations to generate a high-level description of object actions and inter-object interactions. The present invention describes a behavior recognition system that can model and detect spatio-temporal interactions between detected entities in a visual scene. A hierarchical generic event detection scheme is presented that uses fuzzy graphical models for representing the spatial associations as well as the temporal dynamics of scene entities. The spatial and temporal attributes of associated objects and groups of objects are handled in separate layers in the hierarchy. In the spatial organization layer, fuzzy graphs are used to model the spatial relations between objects. In the temporal organization layer, directed fuzzy graphs are used to model the temporal behaviors of objects. Also described is a behavior specification language that helps an analyst easily describe the event that needs to be detected using either simple linguistic queries or graphical queries.

Current approaches to behavior or event recognition lack generality and cannot be extended beyond the intended domain. They use motion detection as a first step to find objects in the scene and are only capable of detecting simplistic actions like running and walking. The present invention describes a generic activity modeling system that is a synergy between the research topics in the areas of swarm optimization, object classification, fuzzy modeling, and graph theory. The present invention is hierarchical, modular and can be expanded to detect a user's choice of appropriately defined events. The spatial and temporal attributes of object interactions are modeled using fuzzy attributed relational graphs (FARGs) which are more robust to non-specific information since the use of fuzzy methods to model inter-object attributes obviates the need to provide specific numbers and exact relations between objects. FARGs provide a compact and easy way to effectively model spatial and temporal attributes of the various objects of interest in the scene. The behavior specification language effectively assists the analyst in querying data for intended scenarios by first describing object associations and then ascribing activities to the associated group of objects either using simple linguistic descriptions or graphical queries. This allows for an expressive and natural description of scene objects in real-time.

Automatic event detection is an integral module in several advanced computer vision systems. This task entails observing raw pixels and generating high-level descriptions of scene objects and their interacting behaviors. Such a technology would be extremely useful in several applications including visual surveillance, video stream summarization, and content-based video retrieval. Object behavior recognition involves first detecting the objects in the scene such as "people," "boats," "buildings," etc., followed by detecting their behaviors or interactions with other objects. These behaviors can range from simple facial expressions and gestures to complex interactions like people exiting cars, people exchanging objects and dispersing, etc. The present invention can be used in a wide array of devices for a variety of applications. For example, the present invention can be applied to automated surveillance systems for monitoring crowd behavior and traffic in malls and enemy congregation areas.

As described above, the present invention is a behavior recognition system for detecting a particular behavior. The system separates the object detection task from the structural and temporal constraint detection task. Thus, the swarm optimization methods are used to located scene objects and then graph matching methods are used to enforce structural and temporal constraints. Classifier swarms are first used to detect all the objects of interest in the scene. Note that that present invention works independently of motion cues. The next step involves using FARGs to associate objects based on the user query. Once the object or object groups are spatially organized, directed fuzzy graphs are used to model the temporal dynamics of the detected group. The behavior detection modules are described below in further detail.

(4) Details of the Invention

To provide the reader with a clear understanding of the present invention, a summary is provided of the cognitive swarm for object recognition that was first introduced in the previous application, U.S. patent application Ser. No. 10/918, 336. Next, described is the behavior recognition system according to the present invention.

(4.1) Classifier (Cognitive) Swarm for Object Recognition

As mentioned above, application Ser. No. 10/918,336 describes the use of cognitive swarms for object recognition. Cognitive swarms combine feature-based object classification with efficient search mechanisms based on particle swarm optimization (PSO). Objects in a visual scene need to be located and classified so they can be tracked effectively for automotive safety, surveillance, perimeter protection, and a variety of other government and commercial applications.

Typically, classification of objects in an image is performed using features extracted from an analysis window which is scanned across the image. This brute force search method can be very computationally intensive, especially if a small window is used since a classification must be performed at each window position. Conventional approaches to reducing the computational load are based on reducing the search space by using another sensor, such as scanning radar to cue the vision system and measure the range of the object. Limitations of the radar approach include high cost, false alarms, the need to associate radar tracks with visual objects, and overall system complexity. Alternatively, previous vision-only approaches have utilized motion-based segmentation using background estimation methods to reduce the search space by generating areas of interest (AOI) around moving objects and/or using stereo vision to estimate range in order to reduce searching in scale.

This approach utilizes the particle swarm optimization (PSO) algorithm, a population-based evolutionary algorithm, which is effective for optimization of a wide range of functions. The algorithm models the exploration of multi-dimensional solution space by a population of individuals where the success of each individual has an influence on the dynamics of other members of the swarm. One of the aspects of this approach is that two of the dimensions are used to locate objects in the image, while the rest of the dimensions are used to optimize the classifier and analysis window parameters.

PSO is a relatively simple optimization method that has its roots in artificial life in general, and to bird flocking and swarming theory in particular; being first described by J. Kennedy and R. Eberhart, in "Particle Swarm Optimization," IEEE Inter. Conference on Neural Networks, 1995. Conceptually, it includes aspects of genetic algorithms and evolutionary programming. Each potential solution is assigned a randomized velocity vector and the potential solutions called "particles" then "fly" through the space in search of the function optima (these particles should not be confused with particle filters, which estimate probability distributions for tracking and localization applications). The particles are self-contained agents that classify local image windows as belonging to one of a set of classes.

The coordinates of each particle in a multi-dimensional parameter space represents a potential solution. Each particle keeps track of its coordinates that are associated with the best solution (pbest) it has observed so far. A global best parameter (gbest) is used to store the best location among all particles. The velocity of each particle is then changed towards pbest and gbest in a probabilistic way according to the following update equations:

$$v^i(t)=wv^i(t-1)+c_1*\text{rand}(\ )*(\text{pbest}-x^i(t-1))+c_2*\text{rand}(\ )*(\text{gbest}-x^i(t-1))$$

$$x^i(t)=x^i(t-1)+v^i(t),$$

where $x^i(t)$ and $v^i(t)$ are the position and velocity vectors at time t of the i-th particle and $c_1$ and $C_2$ are parameters that weight the influence of their respective terms in the velocity update equation, and * denotes multiplication. w is a decay constant which allows the swarm to converge to a solution more quickly. The rand( ) function generates a random number between 0 and 1 with a uniform distribution.

The above dynamics reflect a socio-psychological model where individual particles change their beliefs in accordance with a combination of their own experience and the best experience of the group (this is in contrast to other models of cognition where an individual changes its beliefs to become more consistent with its own experience only). The random element introduces a source of noise which enables an initial random search of the solution space. The search then becomes more directed after a few iterations as the swarm starts to concentrate on more favorable regions. In contrast to genetic algorithms, solution representation is straightforward due to the separable nature of the PSO solution space.

This type of search is much more efficient than a brute force search or gradient-based search methods. It is similar to genetic algorithms in that it can be used for discontinuous and noisy solution spaces since it only requires an evaluation of the function to be optimized at each particle position, with no gradient information being used. Unlike the chromosome string representation of potential solutions used in genetic algorithms, the PSO particles do not undergo cross-over or mutation operations, they just travel to a different position, calculate the solution at that position, and compare it with their own and global previous best positions in order to update their velocity vectors.

The evolution of a good solution is stable in PSO because of the way solutions are represented (e.g., small changes in the representation results in small changes in the solution, which result in improved convergence properties compared to genetic algorithms). PSO relies on the fact that in most practical problems, the optimum solution usually has better than average solutions (i.e., good solutions) residing in a volume around it. These good solutions tend to attract the particles to the region where the optimum lies. The swarm becomes more and more concentrated until the optimum is found (e.g., gbest no longer changes). PSO has been applied to a wide variety of optimization problems.

It has been found experimentally that the number of particles and iterations required scale weakly with the dimensionality of the solution space. The total number of function evaluations is very small compared to the size of the solution space, as was shown in the previous patent application.

Although basic PSO only searches for a single optimum in the solution space, various approaches have been described for finding multiple local optima or "niches."

The basic cognitive swarm concept described in the previous application is shown in FIG. 1. As shown in FIG. 1, a swarm of classifier agents 100 (i.e., PSO particles), each of which is a self-contained image classifier, searches for objects 102 in a combined image 104/classifier parameter 106 solution space 108. Additionally, each agent 100 both competes and cooperates with other agents 100 using simple dynamics to find objects 102 in the scene by optimizing the classifier outputs. Furthermore, analysis and experimental results show that cognitive swarms can both improve the detection/false alarm operating point and improve update rates by orders of magnitude over conventional search methods.

The objective is to find multiple instances of an object class in an input image 104. The PSO particles 100 move in a solution space 108 where two of the dimensions represent the x coordinate 110 and the y coordinate 112 in the input image 104. The key concept in this approach is that each particle 100 in the PSO swarm is a self-contained object classifier which outputs a value representing the classification confidence that the image distribution in the analysis window 114 associated with that particle 100 is or is not a member of the object class. All particles 100 implement the same classifier, only the classifier parameters 106 vary as the particle 100 visits different positions in the solution space 108.

Two of the solution space dimensions represent the location of the analysis window 114 on the input image 104. A third dimension represents the size or scale of the analysis window 114 in order to match the unknown size of objects 102 in the image 104. Additional dimensions can be used to represent other classifier parameters such as, for example, the rotation angle of the object 102. This method differs from other vision algorithms which use swarm intelligence in that the other methods use swarms to build object models using ant colony pheromone-based ideas.

In this method, swarming occurs at the classifier level in a space consisting of object location, scale, and other classifier parameter dimensions, where each particle 100 is a complete classifier. The particles 100 swarm in this space 108 in order to find the local optima which correspond to objects in the image. The classifier details are not visible at the abstraction level of the swarm. One can imagine a multidimensional surface of classifier confidence (a type of saliency map) that can be generated if the classifier is scanned across the image. The classifier confidence map for an image 104 can be discontinuous and noisy, with many isolated false alarms where the classifier responds incorrectly to patterns in the image. Thus, using gradient-based methods to find objects in an image is problematic, which is why an exhaustive search is usually used. By generating classifier confidence maps for many images, it has been found experimentally that objects 102 in the scene tend to have large "cores" of high confidence values. Many false alarms tend to be isolated with small cores. Since the probability of a particle landing in or near a core is greater for a larger core, the particles 100 are attracted more to larger cores and the number of false alarms in an image is reduced using PSO compared to exhaustive searching. In an exhaustive search, all of the false alarms in an image 104 will be detected so the classifier must be biased towards very low false alarm rates in order to keep the overall false alarm rate low, which also has the side effect of reducing the detection rate.

Figure 2:
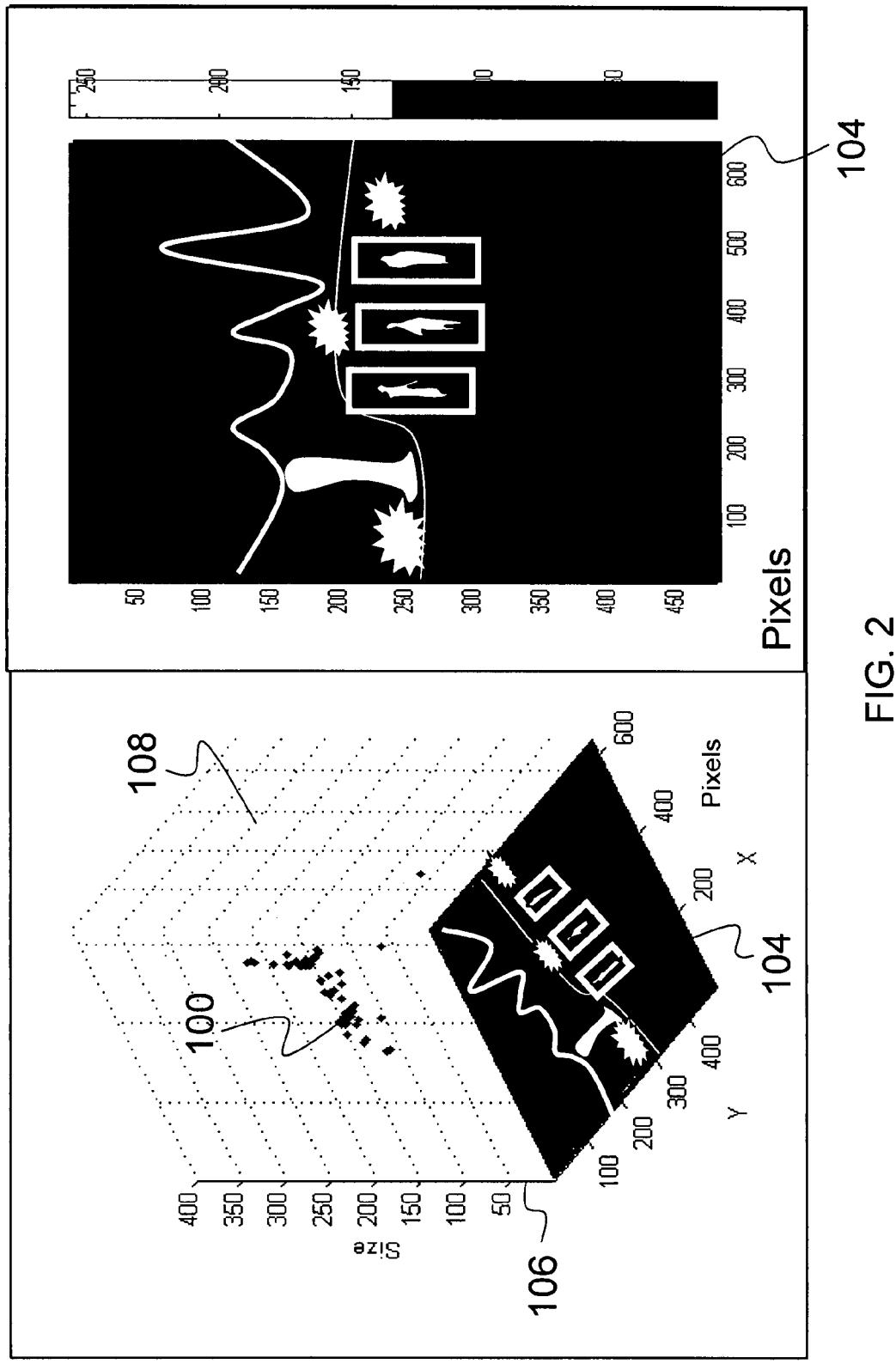
FIG. 2 is an illustration of exemplary multiple object recognition by a cognitive swarm, comprising human classifier agents using local image erasure.

In summary, the previous application described how a single large cognitive swarm can be used to recognize multiple objects in the scene through "sequential erasing" in which a detected object is erased before reinitializing the swarm to search for additional objects. The previous application also described a "probabilistic" clustering approach for detecting multiple objects. For illustrative purposes, exemplary results for detecting multiple objects using sequential erasure are shown in FIG. 2. As shown, the agents 100 are searching for actual objects in a combined image 104/classifier 106 parameter solution space 108.

In other words, classifier swarm methods are a new way of visual recognition of objects in an image that combine feature-based object classification with efficient search mechanisms based on swarm intelligence. The approach utilizes the particle swarm optimization algorithm (PSO), a population based evolutionary algorithm, which is effective for optimization of a wide range of functions. PSO searches a multidimensional solution space for a global optimum using a population of "particles" in which each particle has its own velocity vector. The approach extends PSO using sequential niching methods to handle multiple minima. Also, each particle in the swarm is actually a self-contained classifier that "flys" through the solution space seeking the most "object-like" regions. By performing this optimization, the classifier swarm simultaneously finds objects in the scene, determines their size, and optimizes the classifier parameters.

Figure 3B:
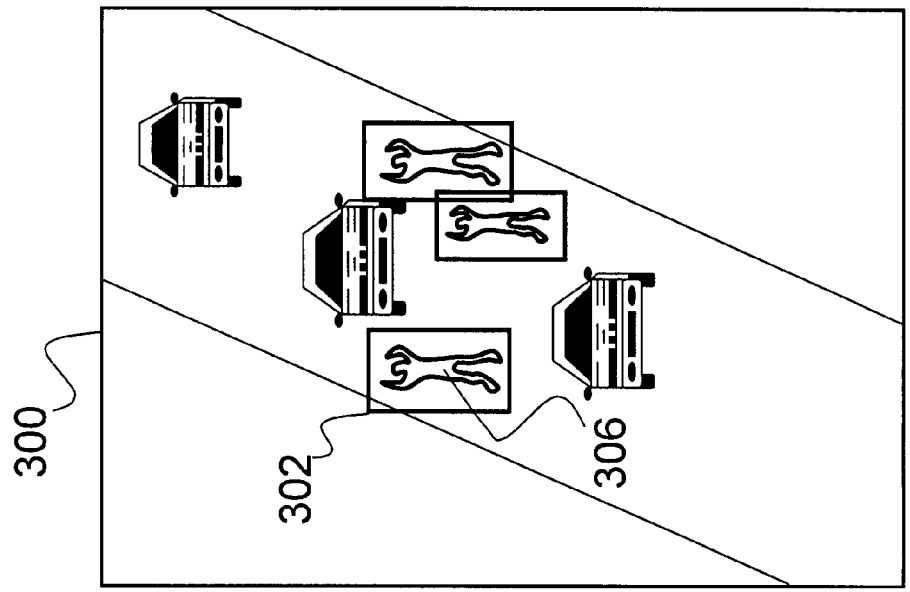
FIG. 3B is an illustration of exemplary vehicle and human classifier swarms detecting objects of interest (humans) in the same visual scene as depicted in FIG. 3A.
Figure 3A:
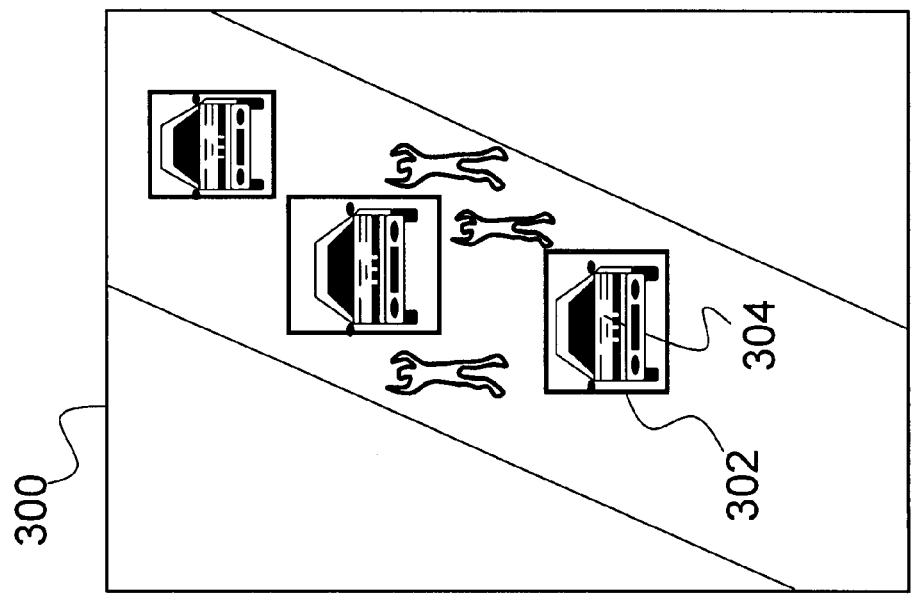
FIG. 3A is an illustration of exemplary vehicle and human classifier swarms detecting objects of interest (vehicles) in a visual scene.

The approach for behavior recognition of the present invention separates the object detection from structure enforcement tasks. In this scheme, swarm optimization methods are first employed to locate and track all the objects of interest in a scene. It should be noted that objects of different kinds can be detected in parallel. An example of operating a human and a vehicle detection swarm in parallel on a given image is shown in FIGS. 3A and 3B. Using the same image 300, FIG. 3A depicts the swarm detecting 302 vehicles 304, while FIG. 3B depicts the swarm detecting 302 humans 306. Once the objects are discovered, the next step is to form associations so that group behaviors can be detected.

(4.2) Fuzzy Graphical Models

As can be appreciated by one skilled in the art, uncertainty pervades many aspects of behavior recognition. Such uncertainty results from a variety of issues, such as the inability of image and video content to be represented and described easily, ill-posed user queries, and imprecisely defined behavior similarity or matching measures. To address these issues, fuzzy sets can be used to model the vagueness that is usually present in the image/video content, user query, and the event similarity measure. The fuzzy attributed relational graph (FARG) is a powerful model for representing image/video content in terms of objects and spatial relations between them. It is well-known that object labels are not crisp, and attribute values such as "small" and "somewhat," as well as spatial relations such as "left-of" and "below," are handled much better by fuzzy techniques. Therefore, the representation can incorporate the vagueness associated with the attributes of the regions as well as those of the relations between the regions.

The present invention uses fuzzy attributed relational graphs (FARGs) for modeling the spatial and temporal aspects of object behaviors. For example, a FARG can be used to represent objects in the scene and their spatial relationships, wherein the nodes represent different entities in the scene and the edges represent the relations between the entities. The node attributes can include fuzzy definitions of properties such as size, shape, color, etc., and the edge attributes can include fuzzy definitions of spatial relations, adjacency, etc. For example, a node attribute class label may be a fuzzy set defined over the linguistic category set {human, boat, car, building}, and the class label of node j may have memberships 0.9, 0.2, 0.2, and 0.1 in the four categories respectively. The membership values range from 0 to 1 and represent the degree of membership in the fuzzy category.

Similarly, another node attribute (object size) may be a fuzzy set defined over the set of linguistic values {small; medium; large}. The edge attributes are also represented using fuzzy sets and linguistic variables in the FARG. For example, the edge attribute spatial relation may be a fuzzy set defined over the set of linguistic values {left-of; right-of; above; below; surrounded-by}. Another example of edge attribute can be adjacency that can be a fuzzy set defined over the set of linguistic values {low; moderate; high}. FARGs provide a compact and easy way to effectively model and represent the various objects of interest in the scene.

Since the objects are represented using FARGs, the object-matching problem is transformed into a sub-graph matching problem. It is well known that sub-graph matching is non-trivial and is, in fact, non-deterministic polynomial time (NP)-complete.

(4.3) Fuzzy Graph Matching (FGM)

Once the scene objects are modeled using a FARG, the next step involves matching the scene FARG with a behavior FARG that an analyst intends to detect. A behavior matching problem is then transformed into a sub-graph matching problem (which is non-trivial and has NP-complete complexity). Following is a brief description of the fuzzy graph matching process.

The proposed FARG matching algorithm uses ideas from relaxation labeling and fuzzy set theory to solve the sub-graph isomorphism problem. The algorithm can handle exact as well as inexact sub-graph matching. The objective function of FGM is inspired by the Assignment Prototype (AP), Fuzzy c-Means FCM, and Graduated Assignment (GA) algorithms. The AP was described by M. P. Windham, in "Numerical classification of proximity data with assignment measure," Journal of Classification, vol. 2, pp. 157-172, 1985. The FCM was described by J. C. Bezdek in "Pattern Recognition with Fuzzy Objective Function Algorithms," Plenum Press, New York, 1981. The GA algorithms were described by S. Gold and A. Rangarajan, in "A graduated assignment algorithm for graph matching," IEEE Transaction on Pattern Analysis and Machine Intelligence, vol. 18, pp. 377-387, April 1996.

Letting A and B denote the two graphs being matched with vertex sets $V_A$ and $V_B$ respectively, the complexity of the FGM algorithm is $O(n^2 m^2)$, where n=$|V_A|$, m=$|V_B|$, and O is an objective function. In other words, n and m represent the number of nodes in graphs A and B respectively. The FGM algorithm uses a membership matrix $U=[u_{ij}]$, where $u_{ij}$ represents the relative degree to which node $i \in V_A$ matches the node $j \in V_B$ (i.e., U is the fuzzy assignment matrix). The objective function used for the FGM algorithm is:

$$J(U, C) = \sum_{i=1}^{n+1} \sum_{j=1}^{m+1} u_{ij}^2 f(c_{ij}) + \eta \sum_{i=1}^{n+1} \sum_{j=1}^{m+1} u_{ij}(1 - u_{ij}). \quad (1)$$

In equation (1), $\eta$ is a constant that controls the relative influence of the two terms in the minimization process. $c_{ij}$ represents the absolute compatibility between nodes $i \in V_A$ and $j \in V$ (given the fuzzy assignments U), taking into account the attributes of the edges incident on nodes i and j and those of the neighboring nodes of i and j. In other words, $C=[c_{ij}]$ is the compatibility matrix. The function $f(\ )$ is similar to a distance function and takes on high values if $c_{ij}$ is low, and vice versa. Additionally, $f(c_{ij})=\exp(-\beta c_{ij})$, where $\beta$ is a control parameter.

As mentioned above, the compatibilities $c_{ij}$ depend on U. Similarly, the assignments U depend on the compatibilities C. U and C can be updated in an alternating fashion, giving rise to a relaxation process. Without loss of generality, it is assumed that $n \geq m$. To accomplish robust matching, dummy nodes can be introduced in each of the graphs being compared. For example, node n+1 in graph A and node m+1 in graph B represent dummy nodes. These dummy nodes are similar to slack variables that are used to deal with inequality constraints in optimization problems. When a particular node in graph A does not match any of the nodes in graph B, it can be assigned to the dummy node of graph B, and vice versa. The dummy node enables us to minimize the objective function J subject to the following constraints:

$$\left.\begin{array}{l}\sum_{j=1}^{m+1} u_{ij} = 1, \text{ for } i = 1, \Lambda, n \\ \sum_{i=1}^{n+1} u_{ij} = 1, \text{ for } j, \Lambda, m \\ u_{ij} \geq 0 \forall i \text{ and } j\end{array}\right\} \quad (2)$$

The first term in equation (1) is minimized if the matching degrees $u_{ij}$ are high whenever the compatibilities $c_{ij}$ are high. However, ideally $u_{ij} \in \{0,1\}$. To accomplish this goal, the second (entropy) term in equation (1) has been added which tries to push the values of $u_{ij}$ towards either zero or one. The update equations for the FGM algorithm are based on the Lagrange method and use the Karush-Kuhn-Tucker conditions. The derivations of the update equations and specific details of the algorithm implementations are provided in an article by S. Medasani and R. Krishnapuram, entitled, "Graph Matching by Relaxation of Fuzzy Assignments," IEEE Transactions on Fuzzy Systems, 9(1), 173-183, February 2001 (hereinafter referred to as "Medasani et al."), which is incorporated herein by reference in its entirety.

After the algorithm converges, U is converted to the closest crisp assignment matrix V (i.e., matrix with binary elements) satisfying the constraints in equation (2). The matrix V is used in computing the degree of match or dissimilarity between graphs A and B, which in turn is used for clustering the graph representations of objects.

The compatibility measure $c_{ij}$ can be tailored to a specific application domain and user preference. Compatibility measures can also be defined that give more weight to node attribute matches than edge attribute matches. For example, Medasani et al. provides details on different compatibility measures and their advantages. The computational complexity of the FGM algorithm can be shown to be $O(n^2 m^2)$. Computing compatibilities is the most computationally expensive part of the FGM algorithm. Note that in the model of the present invention, the graphs are completely connected, even though the strengths of relations between edges may be zero.

(4.4) Block Diagram of Behavior Modeling Engine

Figure 4:
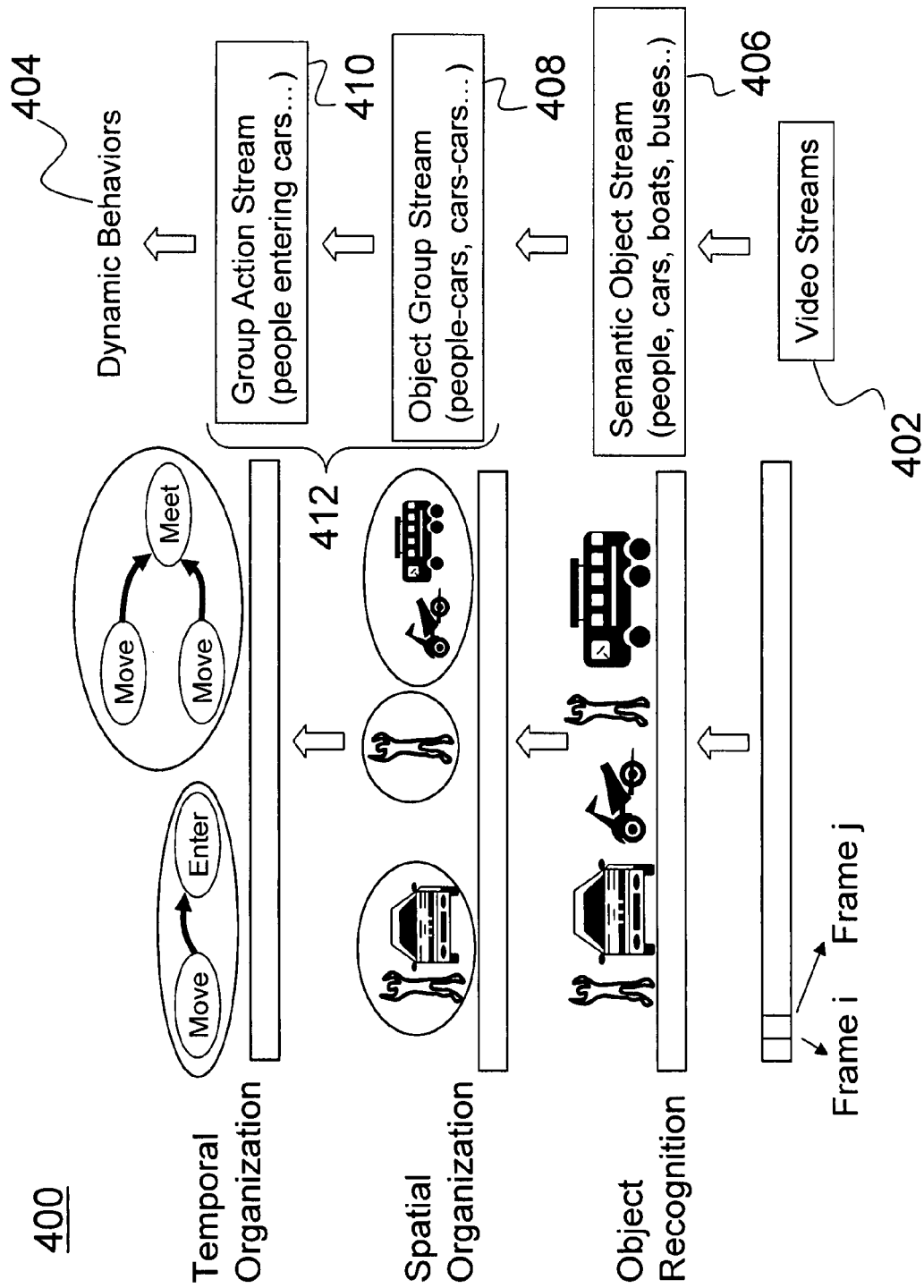
FIG. 4 is a flow diagram of a behavior/event recognition system according to the present invention.

FIG. 4 is a flow diagram of the behavior recognition system 400 according to the present invention. The hierarchical system receives video frames (i.e., a video stream 402) as inputs and outputs the detected behaviors 404. The first layer in the system corresponds to the raw video stream 402 from which objects and behaviors need to be detected.

In the second layer, the object recognition layer, a semantic object stream module 406 employs a variety of classifiers to detect several objects of interest. Non-limiting examples of such objects include people, boats, buses, etc. The list of detected semantic objects, the semantic library, can easily be expanded by training a classifier to detect any novel entity, non-limiting examples of which include cars, planes, etc. The objects are detected using a classifier swarm as described above.

In the third layer, the spatial organization layer, an object group stream module 408 groups detected objects by enforcing spatial relation constraints. These groups can represent a variety of spatial relation scenarios, non-limiting examples of which include people next-to cars or buses, people exiting buildings, people right-of a security tower, etc. The object group module 408 uses fuzzy graphical models and predominantly deals with organizing detected objects into spatially coherent entities. The nodes in the graphical model are the discovered scene objects. The link attributes encompass relationships between nodes including spatial relations. Using FARG models, the present invention can linguistically represent object spatial structure. By appropriately mapping (via membership functions) the neighborhood of a reference object to a fuzzy set, spatial relations can be modeled in an expressive manner. Once a FARG representing the scene is generated, sub-graph isomorphism is used to locate the sub-graph that matches the user-defined behavior. This layer therefore takes semantic objects from the video stream and outputs groups of objects that satisfy analyst-defined object associations.

In the next layer, the temporal organization layer, a group action stream module 410 uses fuzzy graphs for modeling the temporal structure in the object behavior. This layer models a variety of activities, non-limiting examples of which include "people exiting and entering cars," "people leaving suitcases," "people carrying weapons" etc. In this layer, the nodes represent actions that single-objects or object-groups are enacting. Non-limiting examples of such actions include "move," "enter," "drop," etc.

The object group stream module 408 and the group action stream module 410 are collectively referred to as a group organization module 412. Collectively, the group organization module 412 utilizes the detected objects from the video stream 402 to generate a behavior 404 of the detected objects.

Following is a non-limiting exemplary scenario for detecting people entering cars. This desired behavior translates to a "human-vehicle" group in the spatial organization layer and a "move-enter" graph for the human in the temporal organization layer for a selected group of objects. The system first detects vehicles and then humans in the video frames. If there are no people near the detected vehicles, the system does not form any groups in the spatial organization layer. Once a human is detected and begins to move, the temporal state associated with the human initializes to "not-moving." As the human approaches a vehicle, the temporal state would change to "move." At approximately the same instant, a new spatial group is formed and the spatial relationship between the human and vehicle initializes to "approaching." When the human enters the car, the node corresponding to the human disappears from the list of active objects and the temporal state changes to "enter." The hierarchy presented in FIG. 4 is modular in that the spatial and temporal dynamics are handled in different layers. As can be appreciated by one skilled in the art, the semantic and scenario libraries can be easily extended by adding the appropriate classifiers and behavior FARGs to the system.

(4.5) Behavior Specification Language (BSL)

The use of FARGs to model scene objects and their interactions provides a powerful tool for a video analyst. The query to track or detect a desired behavior can be specified in three different ways: (1) linguistic; (2) graphical; and (3) markup language.

(4.5.1) Linguistic Query

In the linguistic query mode, the video analyst describes the node or object attributes, the spatial relationships between objects, and the temporal attributes using fuzzy linguistic terms. For example, a linguistic query to find people entering cars from a specific direction can be written as follows:

"Human moving towards and entering vehicle from the left side."

In this query, "human" and "vehicle" are the object recognition layer objects. Additionally, "left" is the spatial relationship that gives us the "human-vehicle" group in the spatial organization layer. The phrases "moving towards," "entering" account for the temporal attributes of the objects in the temporal organization layer. Since these terms and actions can be labeled using fuzzy sets, the analyst can query the system using simple linguistic and easily expressive queries. Such fuzzy sets were described by R. Krishnapuram, S. Medasani, S. Jung and Y. Choi, in an article entitled, "FIRST—A Fuzzy Information Retrieval System," in IEEE Transactions on Knowledge and Data Engineering (TKDE), October 2004 (hereinafter referred to as "Krishnapuram et al.").

(4.5.2) Graphical Query

Figure 5:
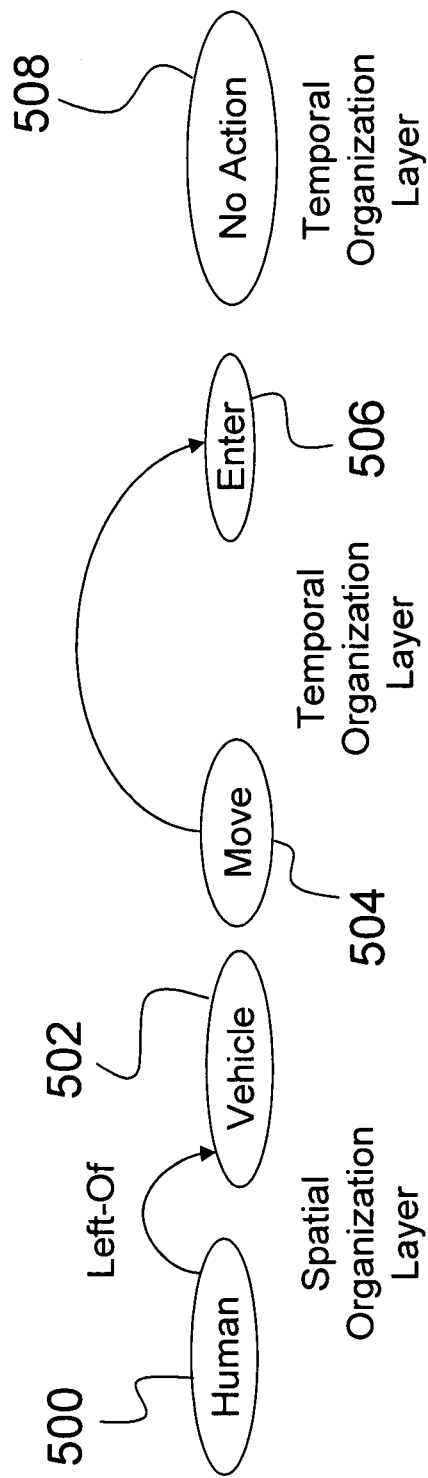
FIG. 5 is an illustration of a graphical query according to the present invention.

The next query mode is via a graphical interface wherein the analyst draws the objects and ascribes spatial and temporal relationships to them. A non-limiting example of such a graphical query is illustrated in FIG. 5. As shown, the analyst can designate a person 500 as being left-of a vehicle 502 in the spatial organization layer. Additionally, the person moving 504 toward and entering 506 the vehicle is also graphically depicted in the temporal organization layer. Alternatively, if the person is queried as doing nothing and simply standing next to the vehicle, then the temporal organization layer depicts that the person as doing nothing 508.

(4.5.3) BSL-Markup Query

A third approach to describing the behavior to be detected is using a behavior specification language (BSL) markup language. An example syntax for the same query as described above is shown below as a BSL-Markup query. One advantage of this mode is the ability to automatically encode processed results from a video for archival purposes. Another significant advantage is that the archived markup data can be used for data mining and discovering new facts about the domain.

```
<Scenario>
    <ObjectList>
        <Object1>
            <Spatial Layer Node>
                <class = Vehicle>
            </Spatial Layer Node>
            <Spatial Relation>
                <Object 2>
                    <Link Prop=RIGHT>
            </Spatial Relation>
            <Temporal Layer Node>
                <action = NONE>
            </Temporal Layer Node>
        </Object1>
        <Object2>
            <Spatial Layer Node>
                <class = Human>
            </Spatial Layer Node>
            <Spatial Relation>
                <Object 1>
```

```
            <Link Prop=LEFT>
         </Spatial Relation>
         <Temporal Layer Node>
            <action = MOVE>
            <action = ENTER>
         </Temporal Layer Node>
      </Object2>
   </ObjectList>
</Scenario>
```

(4.6) Behavior Recognition System Components

Figure 6:
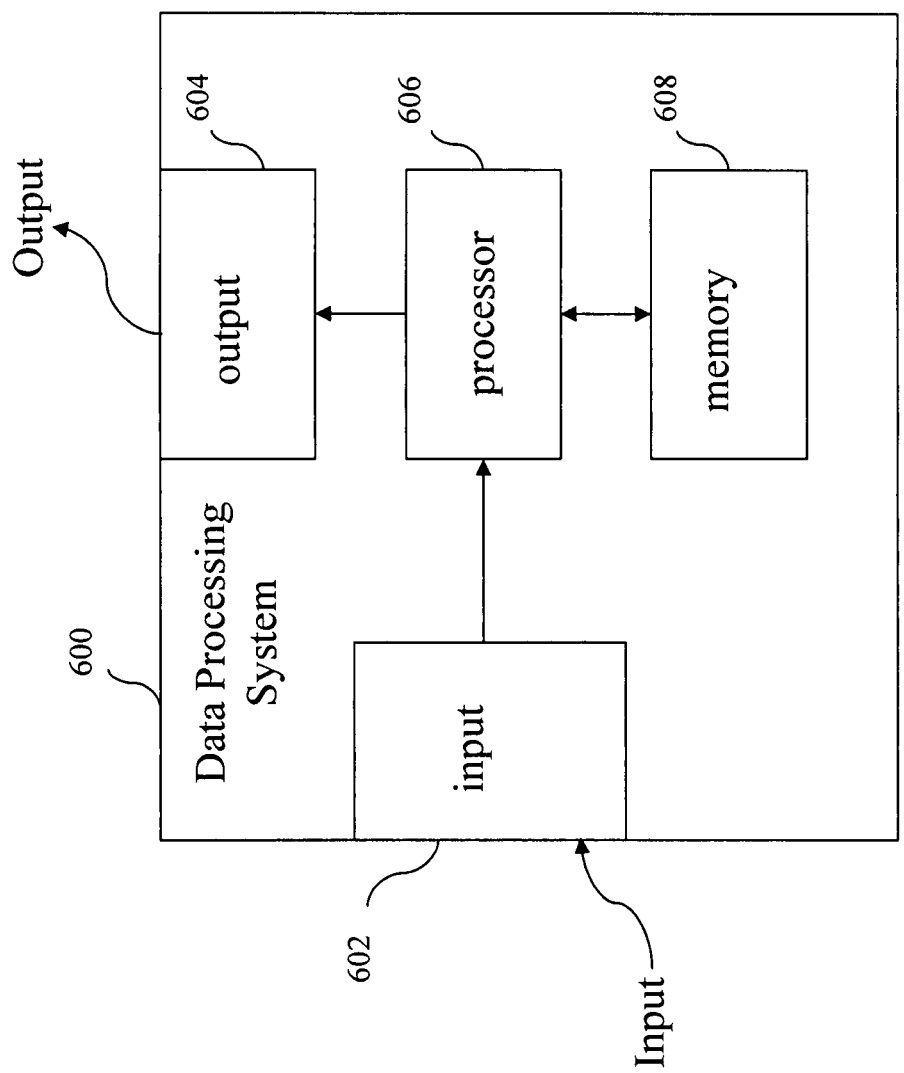
FIG. 6 is a component diagram depicting components of a data processing system according to the present invention.

A block diagram depicting the components of the behavior recognition system of the present invention is provided in FIG. 6. The behavior recognition system 600 comprises an input 602 for receiving information from at least one sensor (e.g., video camera) for use in detecting objects in a scene. Note that the input 602 may include multiple "ports." Typically, input is received from at least one sensor, non-limiting examples of which include video image sensors. Input may also be received from a user as a user query, as described above. An output 604 is connected with the processor for providing information regarding the presence and/or behavior of object(s) in the scene to the user or to other systems in order that a network of computer systems may serve as a behavior recognition system. Output may also be provided to other devices or other programs; e.g., to other software modules, for use therein. The input 602 and the output 604 are both coupled with a processor 606, which may be a general-purpose computer processor or a specialized processor designed specifically for use with the present invention. The processor 606 is coupled with a memory 608 to permit storage of data and software to be manipulated by commands to the processor.

(4.4) Computer Program Product

Figure 7:
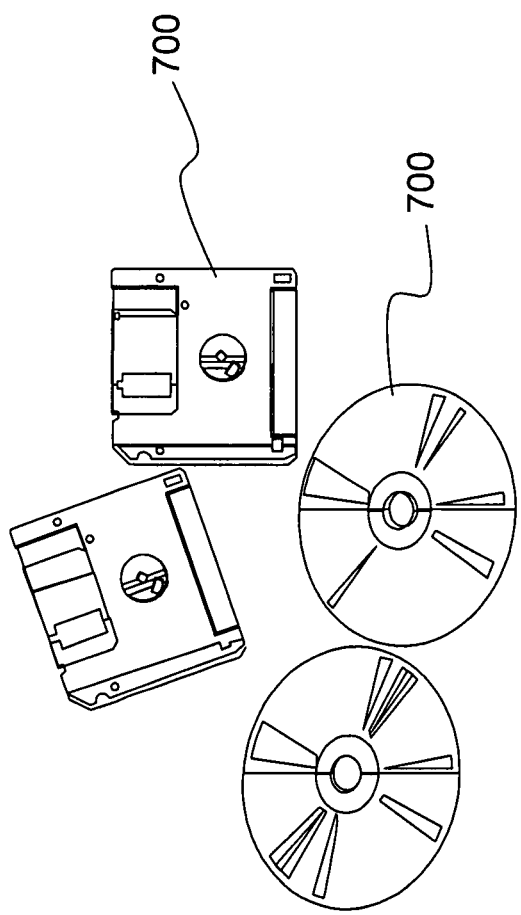
FIG. 7 illustrates a computer program product according to the present invention.

An illustrative diagram of a computer program product embodying the present invention is depicted in FIG. 7. The computer program product 700 is depicted as an optical disk such as a CD or DVD. However, as mentioned previously, the computer program product generally represents computer-readable instructions stored on any compatible computer-readable medium.

(4.6) Exemplary Experimental Results

Figure 8A:
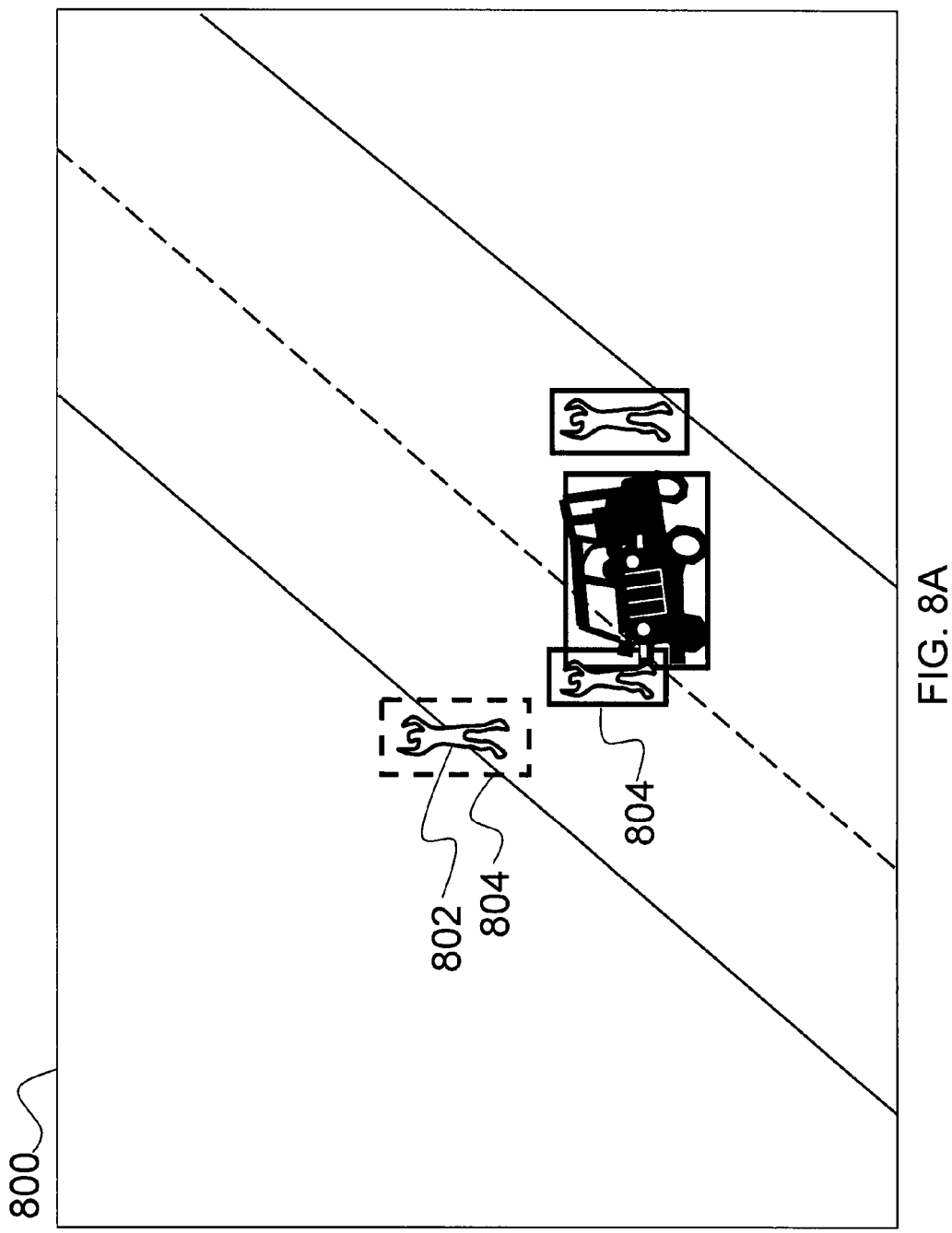
FIG. 8A is an illustration of exemplary results from the use of the behavior/event recognition system according to the present invention, depicting an object and subsets that satisfy a predetermined spatial structure.
Figure 8B:
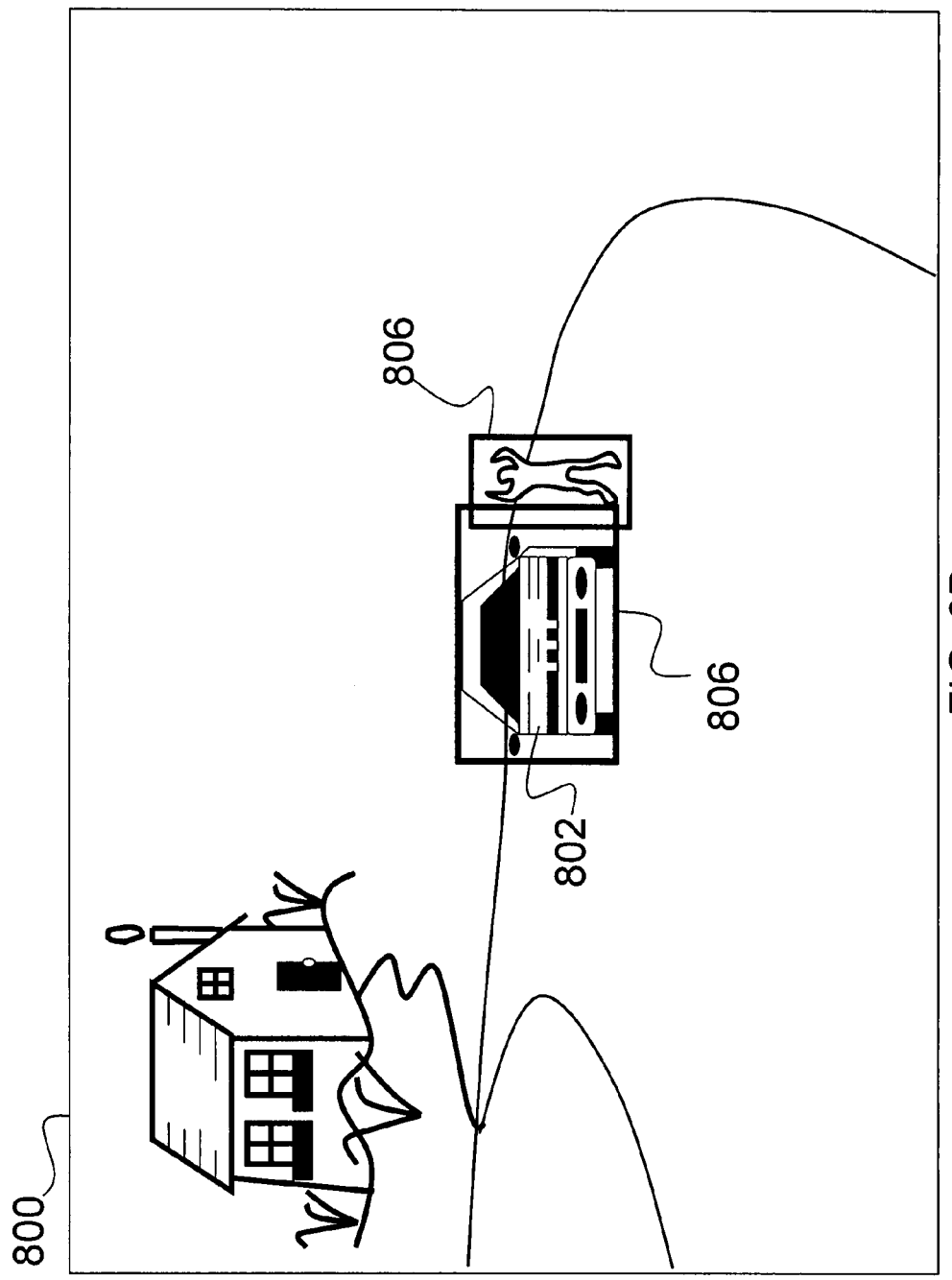
FIG. 8B is an illustration of exemplary results from the use of the behavior/event recognition system according to the present invention, depicting subsets that satisfy a predetermined spatial structure.
Figure 8C:
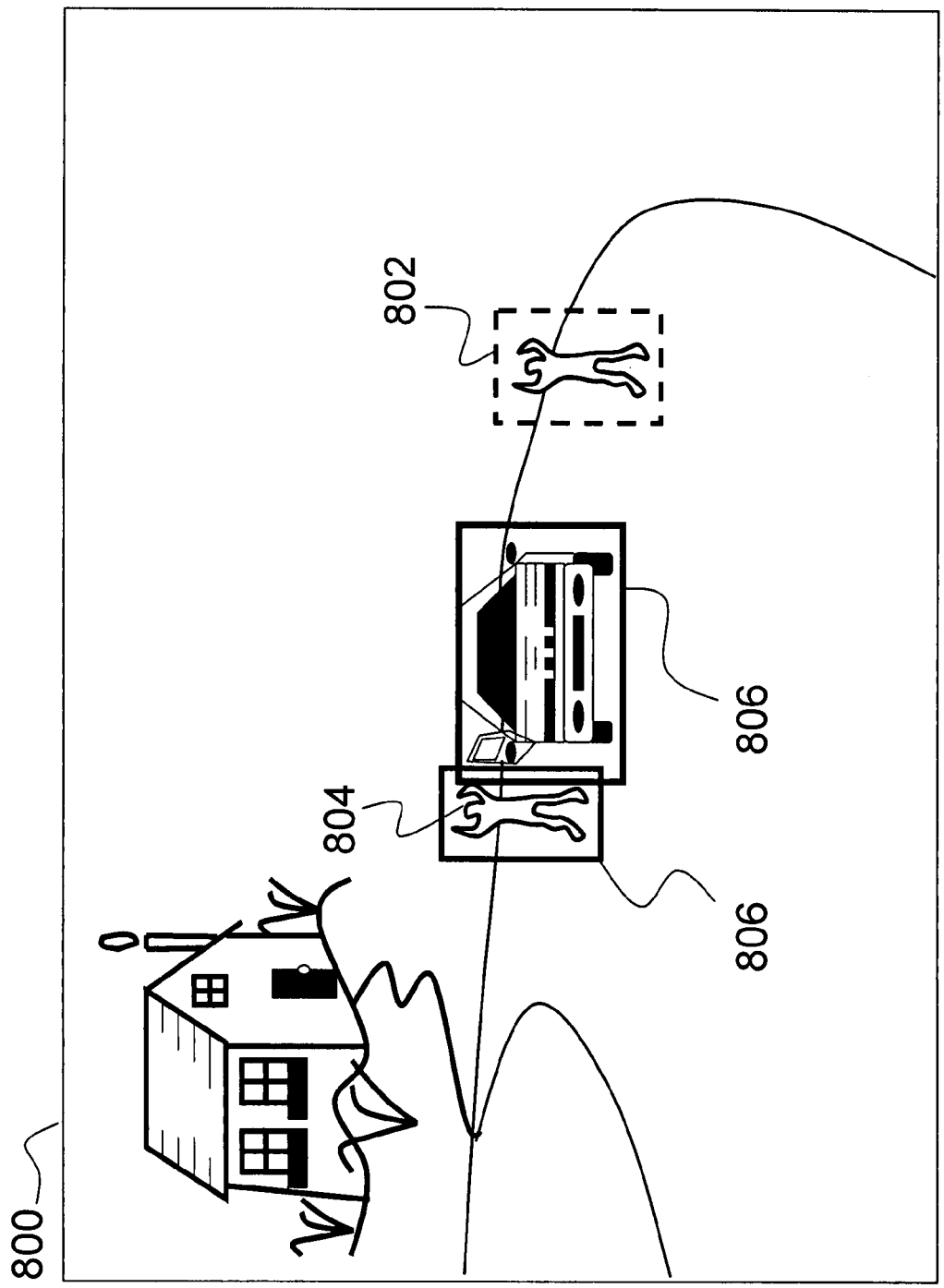
FIG. 8C is an illustration of exemplary results from the use of the behavior/event recognition system according to the present invention, depicting subsets that satisfy a predetermined spatial structure.

Exemplary results using the behavior recognition system are shown in FIGS. 8A-8C. The results are depicted as a processed video frame 800. Objects 802 that are detected in the scene are represented using rectangles with dashed lines 804 and the subsets that satisfy the relevant spatial structure (e.g., humans-next-to-vehicles) are shown in solid-lined rectangles 806. Note that since fuzzy spatial relationships are used in the graphs, the object structure can be represented using linguistic terms such as "left," "right," "above," "below," etc. Further details regarding fuzzy spatial relationships can be found at Krishnapuram et al.

FIG. 8A depicts a video frame 800 with the spatial structure of "humans-next-to-vehicle." FIG. 8B depicts a video frame 800 with the spatial structure of "human-to-right-of-vehicle." FIG. 8C depicts a video frame 800 with the spatial structure of "human-to-left-of-vehicle."

In order to test the effectiveness of the system, video sequences were collected of people entering and exiting vehicles in urban neighborhoods. A total of 455 video frames were used to test the system performance in detecting behaviors. These 455 frames included twenty-five single object Enter/Exit Car behavior events. The system was able to detect twenty-four of these behavior events correctly (96%).

What is claimed is:

1. A behavior recognition system for detecting the behavior of objects in a scene, the system comprising a processor and a memory coupled with the processor, wherein the processor includes:
    a semantic object stream module for receiving a video stream having at least two frames and detecting objects in the video stream; and
    a group organization module for utilizing the detected objects from the video stream to detect a behavior of the detected objects, including both static and moving objects, where the group organization module detects the behavior using a hierarchical event detection scheme further comprising:
        a spatial organization layer comprising an object group stream module, the object group stream module being configured to spatially organize the detected objects to have relative spatial relationships; and
        a temporal organization layer comprising a group action stream module, the group action stream module being configured to model a temporal structure of the detected objects, the temporal structure being an action of the detected objects between the two frames, whereby through detecting, organizing and modeling actions of objects, a user can detect the behavior of the objects; and
    wherein the group organization module is operative for using fuzzy attributed relational graphs (FARGs) for modeling spatial and temporal aspects of the behavior of the object to generate a scene FARG from the detected objects in the scene;
    wherein the FARGs include nodes and edges, with the nodes representing different objects in the scene and the edges representing relationships between the objects;
    wherein the processor is further configured to receive a user query to detect a desired behavior, and based on the query and objects in the video stream, identify if the objects exhibit the desired behavior;
    wherein the processor is further configured to associate the user query with a behavior FARG, with the behavior FARG modeling the spatial and temporal aspects of a behavior the user is searching for, and once associated, the processor matches the scene FARG with a behavior FARG to identify an object exhibiting the desired behavior; and
    wherein the scene FARG is matched with the behavior FARG by determining compatibilities between nodes in the FARGs and using the compatibilities in a fuzzy graph matching (FGM) algorithm to match the scene FARG with the behavior FARG.

2. A behavior recognition system as set forth in claim 1, wherein the processor is further configured to receive the user query in a form selected from a group consisting of a linguistic query, a graphical query, and a markup language query.

3. A behavior recognition system as set forth in claim 1, wherein the semantic object stream module further comprises a plurality of agents that are configured to detect objects in the video stream.

4. A computer program product for behavior recognition, the computer program product comprising computer-readable instruction means stored on a non-transitory computer-readable medium that are executable by a computer for causing the computer to perform operations of:
    receiving a video stream having at least two frames and detecting objects in the video stream; and
    utilizing the detected objects from the video stream to detect a behavior of the detected objects, including both static and moving objects, using a hierarchical event detection scheme further comprising operations of:
spatially organizing the detected objects to have relative spatial relationships; and
modeling a temporal structure of the detected objects, the temporal structure being an action of the detected objects between the two frames, whereby through detecting, organizing and modeling actions of objects, a user can detect the behavior of the objects; and
using fuzzy attributed relational graphs (FARGs) to model spatial and temporal aspects of the behavior of the object to generate a scene FARG from the detected objects in the scene;
generating the FARGs to include nodes and edges, with the nodes representing different objects in the scene and the edges representing relationships between the objects;
receiving a user query to detect a desired behavior, and based on the query and objects in the video stream, identify if the objects exhibit the desired behavior;
associating the user query with a behavior FARG, with the behavior FARG modeling the spatial and temporal aspects of a behavior the user is searching for, and once associated, the system matches the scene FARG with a behavior FARG to identify an object exhibiting the desired behavior; and
wherein the scene FARG is matched with the behavior FARG by determining compatibilities between nodes in the FARGs and using the compatibilities in a fuzzy graph matching (FGM) algorithm to match the scene FARG with the behavior FARG.

5. A computer program product as set forth in claim 4, further comprising instruction means for causing a computer to receive the user query in a form selected from a group consisting of a linguistic query, a graphical query, and a markup language query.

6. A computer program product as set forth in claim 4, further comprising instruction means for causing a computer to detect objects in the video stream using a plurality of agents.

7. A computer implemented method for behavior recognition, comprising acts of:

receiving, in a processor, a video stream having at least two frames and detecting objects in the video stream; and
utilizing the detected objects from the video stream to detect a behavior of the detected objects, including both static and moving objects, using a hierarchical event detection scheme further comprising act of:
spatially organizing the detected objects to have relative spatial relationships; and
modeling a temporal structure of the detected objects, the temporal structure being an action of the detected objects between the two frames, whereby through detecting, organizing and modeling actions of objects, a user can detect the behavior of the objects; and
using fuzzy attributed relational graphs (FARGs) to model spatial and temporal aspects of the behavior of the object to generate a scene FARG from the detected objects in the scene;
generating the FARGs to include nodes and edges, with the nodes representing different objects in the scene and the edges representing relationships between the objects;
receiving a user query to detect a desired behavior, and based on the query and objects in the video stream, identify if the objects exhibit the desired behavior;
associating the user query with a behavior FARG, with the behavior FARG modeling the spatial and temporal aspects of a behavior the user is searching for, and once associated, the system matches the scene FARG with a behavior FARG to identify an object exhibiting the desired behavior; and
wherein the scene FARG is matched with the behavior FARG by determining compatibilities between nodes in the FARGs and using the compatibilities in a fuzzy graph matching (FGM) algorithm to match the scene FARG with the behavior FARG.

8. A computer implemented method as set forth in claim 7, further comprising an act of receiving a user query in a form selected from a group consisting of a linguistic query, a graphical query, and a markup language query.

9. A method computer implemented as set forth in claim 7, further comprising an act of detecting objects in the video stream using a plurality of agents.

* * * * *